(12) United States Patent
Liu et al.

(10) Patent No.: US 8,989,080 B2
(45) Date of Patent: Mar. 24, 2015

(54) METHOD AND APPARATUS FOR COOPERATION IN COGNITIVE RADIO NETWORKS

(75) Inventors: Hang Liu, Yardley, PA (US); Sha Hua, Brooklyn, NY (US); Mingquan Wu, Princeton Junction, NJ (US); Jun Li, Cranbury, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 92 days.

(21) Appl. No.: 13/811,293

(22) PCT Filed: Jul. 27, 2010

(86) PCT No.: PCT/US2010/043314
§ 371 (c)(1),
(2), (4) Date: Jan. 21, 2013

(87) PCT Pub. No.: WO2012/015391
PCT Pub. Date: Feb. 2, 2012

(65) Prior Publication Data
US 2013/0114500 A1 May 9, 2013

(51) Int. Cl.
*H04W 16/14* (2009.01)
*H04B 7/02* (2006.01)
*H04B 7/155* (2006.01)
(Continued)

(52) U.S. Cl.
CPC ............... *H04W 16/14* (2013.01); *H04B 7/024* (2013.01); *H04B 7/15542* (2013.01); *H04B 7/2656* (2013.01); *H04W 84/047* (2013.01)
USPC .......................................... 370/315; 370/329

(58) Field of Classification Search
CPC ............... H04W 16/14; H04W 84/047; H04B 7/15542; H04B 7/024; H04B 7/2656

USPC ......... 370/315, 252, 468, 442, 447, 461, 462, 370/328, 329
See application file for complete search history.

(56) References Cited

U.S. PATENT DOCUMENTS

2006/0167784 A1* 7/2006 Hoffberg ........................ 705/37
2010/0061299 A1* 3/2010 Kennedy et al. .............. 370/328
(Continued)

OTHER PUBLICATIONS

Manna et al., "Cooperative Amplify-and-Forward Relaying in Cognitive Radio Networks", 2010 Proceedings of the 5th Int'l. Conference on Cognitive Radio Oriented Wireless Networks & Communications (CROWNCOM), Jun. 9, 2010, pp. 1-5.
Scutari et al., "MIMO Cognitive Radio: A Game Theoretical Approach", IEEE Transactions on Signal Processing, vol. 58, No. 2, Feb. 1, 2010, pp. 761-780.
(Continued)

*Primary Examiner* — Brian D Nguyen
(74) *Attorney, Agent, or Firm* — Robert D. Shedd; Jerome G. Schaefer

(57) ABSTRACT

A method and apparatus are described including competing by a secondary transmitter with a plurality of secondary nodes in a cognitive radio network to become a relay node for a primary transmitter, the secondary nodes being secondary transmitters and secondary receivers, receiving data transmitted by the primary transmitter in a first time slot if the secondary transmitter was successful in the competition, relaying the received data transmitted by the primary transmitter to a primary receiver in a second time slot, transmitting secondary data to a corresponding secondary receiver in a subslot of the second time slot and transmitting the secondary data to the corresponding secondary receiver in a subslot of the first time slot if the secondary transmitter was not successful in the competition and if the corresponding secondary receiver was successful in the competition.

16 Claims, 9 Drawing Sheets

(51) Int. Cl.
*H04B 7/26* (2006.01)
*H04W 84/04* (2009.01)

(56) References Cited

U.S. PATENT DOCUMENTS

| | | | |
|---|---|---|---|
| 2010/0124181 A1* | 5/2010 | Hosein | 370/252 |
| 2010/0235285 A1* | 9/2010 | Hoffberg | 705/75 |
| 2010/0254312 A1* | 10/2010 | Kennedy | 370/328 |
| 2011/0004513 A1* | 1/2011 | Hoffberg | 705/14.1 |
| 2011/0296268 A1* | 12/2011 | Ao et al. | 714/748 |

OTHER PUBLICATIONS

Simeone et al., "Spectrum Leasing to Cooperating Secondary Ad Hoc Networks", IEEE Journal on Selected Areas in Communications, vol. 25, No. 1, Jan. 1, 2008, pp. 203-213.

Wang et al., "Cooperative Spectrum Sharing in Cognitive Radio Networks: A Game-Theoretic Approach", Int'l. Conference on Communications (ICC), 2010 IEEE, May 23, 2010, pp. 1-5.

Yi et al., "Cooperative Communication-Aware Spectrum Leasing in Cognitive Radio Networks", 2010 IEEE Symposium on New Frontiers in Dynamic Spectrum, Apr. 6, 2010, pp. 1-11.

Search Report Dated Jul. 8, 2011.

* cited by examiner

METHOD AND APPARATUS FOR COOPERATION IN COGNITIVE RADIO NETWORKS

FIELD OF INVENTION

This application claims the benefit, under 35 U.S.C. §365 of International Application PCT/US2010/043314, filed Jul. 27, 2010, which was published in accordance with PCT Article 21(2) on Feb. 2, 2012 in English.

The present invention relates to cooperation by means of relay nodes in cognitive radio networks so that the relay nodes (as secondary users) can gain access to the unused portions of spectrum licensed to primary users.

BACKGROUND

In the prior art, the following two approaches have been proposed for cognitive radio networks. The first approach is the so-called common model. Under this framework, SUs sense the channel in search of temporal and spatial spectrum holes and exploit such detected opportunities to complete their transmission. Another approach, spectrum leasing requires the PU's participation. In this model, the PUs negotiate with the SUs to lease part of their owned spectral resource in exchange for appropriate remuneration.

Recently, a new paradigm termed Cooperative Cognitive Radio Networks (CCRN) is advocated. In CCRN, SUs cooperatively relay the data for the PUs. By exploiting the cooperative diversity, the transmission rate of PUs can be largely improved. In return, The PU leases its channel to SUs for a fraction of time to transmit SUs' data, resulting in a "win-win" situation.

Existing CCRN-based schemes all operate in a time-division fashion. Data is transmitted frame by frame for a primary link. A frame duration is divided into three time slots (phases). The first time slot (phase) is used for the primary transmitter to send data to the relaying SUs. In the second time slot (phase), those SUs form a distributed antenna array to relay the primary data to the primary receiver, improving the throughput of primary link. In return, the third time slot (phase) is then leased to the SUs for their own transmissions.

Although such framework of CCRN improves both the PU and SU's throughput, there still exist some inefficiencies, specifically in two aspects. First, the PU must completely give out its spectrum access to the SUs to transmit the secondary data in the third time slot, as a reward for SUs helping to relay the primary data. The throughput that the SUs can obtain in this phase should compensate for the power that they consumed in the previous relaying communications, otherwise the SUs would not have incentive to participate. Thus, the length of the third time slot should be set reasonably large. This introduces a high overhead to the PUs' communications. Second, from the SUs' point of view, the transmission of their traffic is confined within the third time slot, which limits the throughput they can achieve. Especially considering there may be multiple secondary links competing for spectrum access in the third phase (time slot), the rate for each link is therefore low.

SUMMARY OF THE INVENTION

The increasing spectral crisis and the observation that large portions of the licensed bands remain under-utilized for most of the time are the two main driving forces behind implementing cognitive radio networks (CRN). With frequency-agile devices, the spectrum utilization can be improved by allowing the secondary users (SU) to dynamically access the licensed bands held by primary users (PU). However, one problem in CRN is how the PUs and SUs can cooperate to benefit both parties.

As used herein a node includes (but is not limited to) a station (STA), a mobile device, a mobile terminal, a dual mode smart phone, a computer, a laptop computer or any other equivalent device.

A method and apparatus are described including competing by a secondary transmitter with a plurality of secondary nodes in a cognitive radio network to become a relay node for a primary transmitter, the secondary nodes being secondary transmitters and secondary receivers, receiving data transmitted by the primary transmitter in a first time slot if the secondary transmitter was successful in the competition, relaying the received data transmitted by the primary transmitter to a primary receiver in a second time slot, transmitting secondary data to a corresponding secondary receiver in a subslot of the second time slot and transmitting the secondary data to the corresponding secondary receiver in a subslot of the first time slot if the secondary transmitter was not successful in the competition and if the corresponding secondary receiver was successful in the competition.

Also described are a method and apparatus including competing by a secondary receiver with a plurality of secondary nodes in a cognitive radio network to become a relay node for a primary transmitter, the secondary nodes being secondary transmitters and secondary receivers, receiving data transmitted by the primary transmitter in a first time slot and receiving secondary data transmitted by a corresponding secondary transmitter in a subslot of the first time slot if the secondary receiver was successful in the competition, relaying the received data transmitted by the primary transmitter to a primary receiver in a second time slot and receiving the secondary data from the corresponding secondary transmitter in a subslot of the second time slot if the secondary receiver was not successful in the competition and if the corresponding secondary transmitter was successful in the competition.

Further described are a method and apparatus including selecting a relay node using game theory and one of transmitting primary data to the relay node and receiving primary data from the relay node.

BRIEF DESCRIPTION OF THE DRAWINGS

The present invention is best understood from the following detailed description when read in conjunction with the accompanying drawings. The drawings include the following figures briefly described below:

FIG. 8 illustrates the resolution of a.

DETAILED DESCRIPTION OF THE PREFERRED EMBODIMENTS

To solve the above problems, a novel design for cooperation among SUs and PUs by exploiting Multiple Input Multiple Output (MIMO) antennas on the SUs is described, called MIMO CCRN framework. MIMO is an emerging physical layer technology that can provide many types of benefits through multiple antennas and advanced signal processing. Multiple independent data streams can be transmitted or received over the MIMO antenna elements. Furthermore, MIMO links can suppress interference from neighboring links. Interference can be cancelled by either the transmitting or the receiving node of an interference link using beam-forming and signal cancellation techniques. Given its potential, MIMO has been adopted in next-generation WiFi, WiMax, and cellular network standards. However how to take advantage of MIMO techniques in cooperative cognitive radio networks has not been explored.

In the MIMO CCRN framework of the present invention, the SUs utilize the capability provided by the MIMO technique to cooperatively relay the traffic for the PUs and simultaneously transmit and receive their own data, in order to maximize performance. In this way, the PU does not need to give a dedicated portion of channel access time to SUs for secondary data transmission. It also allows SUs to optimize their resources for relaying primary data and transmitting their own data in both the temporal and spatial domains.

Figure 1:
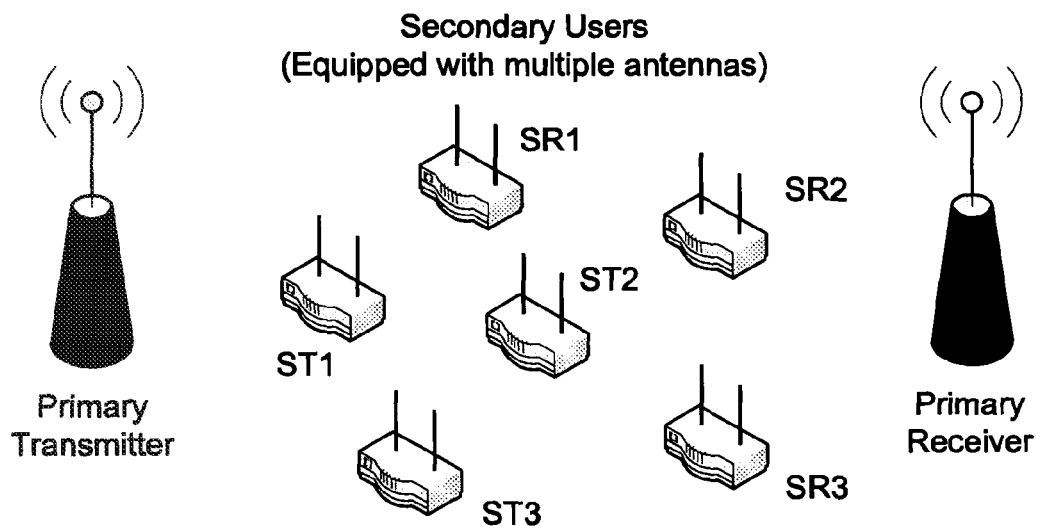
FIG. 1 shows a pair of primary users co-located with an ad-hoc network of secondary users, where each secondary user is equipped with multiple antennas.

FIG. 1 shows the system model for MIMO cooperative cognitive radio networks that are considered herein. A PU, e.g. a base station in a cellular network, sends data to another PU, i.e. a mobile device. A secondary network is seeking to exploit possible transmission opportunities on the same spectrum band. PUs may select some of SUs to be the cooperative relays in order to increase the primary data throughput. The SUs relay primary data, and are granted to use the same spectrum for concurrent transmission of their own data with the MIMO capability, as a reward for being cooperative relays. An example is used to explain the basic idea of MIMO CCRN of the present invention. Assuming the primary users are "legacy" devices with a single antenna and the secondary users are "new comers", equipped with MIMO antennas. Note that the framework of the present invention can be extended to allow multiple antennas on both PUs and SUs as long as the antenna's degrees of freedom (DOFs) on the SUs is greater than the number of data streams transmitted by the PU. The time period for a PU transmission is divided into two phases. In the first phase, the PU broadcasts data to a set of relaying secondary receivers, for example SR1 and ST2. At the same time, a SU, e.g. ST1 can send its secondary data to another SU, e.g. SR1. A secondary receiver with multiple MIMO antennas can receive simultaneously from the primary and the secondary transmitters as long as the total number of primary and secondary streams is no greater than its antenna's DoFs. In the second phase, the relaying secondary receiver SUs, e.g. SR1 and ST2, relay the primary data to the PU receiver. At the same time, a SU, e.g. ST2 can transmit the secondary data to another SU, e.g. SR2 as long as it ensures the interference of the secondary stream is cancelled at the primary receiver using beam-forming. In this approach, SUs' cooperative relay of the data of the PUs and their own transmissions occur simultaneously, which totally avoids the third phase (a PU giving its spectrum access for dedicated secondary data transmission). Furthermore, the PU is not required to have MIMO capability and the PU hardware does not have to be changed. The MIMO CCRN of the present invention can greatly improve the performance of both PUs and SUs by exploiting MIMO. Of course, the trade-off is that SUs must be equipped with more sophisticated MIMO techniques that were expected to be widely adopted in future radio devices.

The present invention describes the design of the proposed MIMO CCRN framework. The following questions are further addressed by the present invention: What are the benefits of exploiting MIMO in cooperative cognitive radio networks? How do PUs select the MIMO SUs to act as cooperative relays? What strategies do the SUs use to relay the primary data and concurrently transmit the secondary data using MIMO antennas? Given that both PUs and SUs are interested in maximizing their own utility, the MIMO CCRN framework can be modeled as a Stackelberg game, which can be used to characterize the benefits of cooperation using MIMO. Specifically, the contributions of the present invention include:
  1) A novel MIMO CCRN framework is proposed and described. With MIMO, multiple transmissions can take place simultaneously without interference. To leverage this capability, in MIMO-CCRN design, the SUs access the spectrum to help relay primary data (data of the PUs (transmitters and receivers that own a license for certain spectral bands), and in return, can simultaneously transmit their own data. A transmission scheduling algorithm is also described under this framework which jointly considers the spatial and temporal dimensions, as well as the Degree of Freedom of nodes to improve spectrum efficiency.
  2) The MIMO-CCRN problem is formulated as a Stackelberg game. Specifically, the PUs act as leaders, which determine the strategy regarding relay selection and time allocation for different phases to optimize their utility, in terms of throughput. SUs act as the followers which conduct a power control game, with the target of maximizing their individual utility. A unique Nash Equilibrium which provides the best strategy is achieved.

First, the basics of MIMO and the benefits it brings are briefly explained as background for the MIMO CCRN design of the present invention. MIMO is a broad area, in which various techniques can be used for different kinds of benefits. Herein the main focus is on Zero-Forcing-Beam-Forming (ZFBF), which is used in MIMO-CCRN framework of the present invention.

Zero Forcing Beam-forming (ZFBF) is one of the most powerful MIMO interference mitigation techniques in MIMO systems. ZFBF uses multiple antennas to steer beams towards the intended receiver to increase SNR, while forming nulls to unintended receivers to avoid interference. Such beamforming can be performed on both transmitter and receiver sides through appropriate pre- and post-coding of the signals. Since ZFBF performs linear correlation and decorrelation with low complexity, it provides a tractable solution with appealing results to many cross-layer designs exploiting the benefits of multiple antennas.

Figure 2:
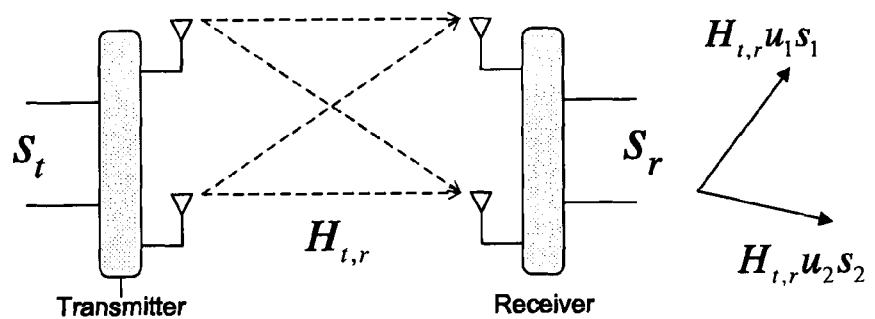
FIG. 2 shows transmission of two streams on a MIMO 2×2 channel.

For ease of explanation, start with the standard 2×2 MIMO channel to understand the rationale of ZFBF, as shown in FIG. 2. Two streams, $s_1$ and $s_2$, can be transmitted simultaneously through this MIMO link without interference. Before transmission, precoding can be performed on the two streams by multiplying the stream $s_1$ with an encoding vector $u_1 = [u_{i1}\ u_{i2}]^T$. Therefore, the transmitted signal will be $s_t = u_1 s_1 + u_2 s_2$. For example, the first antenna will transmit the signal $s_{t1} = u_{t1}s_1 + u_{21}s_2$ and the second antenna will transmit the signal $s_{t2} = u_{12}s_1 + u_{22}s_2$, each of the signals is a weighted combination of the original streams $s_1$ and $s_2$.

Let $H_{t,r}$ denote the 2×2 channel matrix between the transmitter and the receiver. Each entry $h_{ij}$ of $H_{t,r}$ is a complex channel coefficient along the path from the $j^{th}$ antenna on the transmitter to the $i^{th}$ antenna on the receiver. Therefore, the received signals on the receiver side can be represented as:

$$s_r = H_{t,r}s_t + n = H_{t,r}u_1 s_1 + H_{t,r}u_2 s_2 + n \qquad (1)$$

where n is channel noise. Since the receiver has two antennas, the received signal exists in a 2-dimensional space. Thus, representing the signals as 2-dimensional vectors is convenient. It can be seen that the receiver receives the sum of two vectors which are along the directions of $H_{t,r}u_1$ and $H_{t,r}u_2$, as shown in FIG. 2. It can be further seen that the encoding vectors $u_1$ and $u_2$ control the direction of the vectors.

Equation (1) shows that the two streams interfere with each other on the receiver side. One way to remove such inter-stream interference is to project the received signal $s_r$ onto a subspace orthogonal to the subspace spanned by the other signal vector. Specifically, two decoding vectors $v_1$ and $v_2$ can be applied to $s_r$ to decode $s_1$ and $s_2$ as $$\tilde{s}_1 = v_1^\dagger H_{t,r}u_1 s_1 + v_1^\dagger H_{t,r}u_2 s_2 + v_1^\dagger n$$

$$\tilde{s}_2 = v_2^\dagger H_{t,r}u_1 s_1 + v_2^\dagger H_{t,r}u_2 s_2 + v_2^\dagger n \qquad (2)$$

If the encoding and decoding vectors are judiciously configured in such a way that $v_1^\dagger H_{t,r}u_2 = 0$ and $v_2^\dagger H_{t,r}u_1 = 0$, the two streams $s_1$ and $s_2$ can be decoded without interference. In the situations where interference from concurrent transmissions is much stronger than the noise, ZFBF techniques can yield spatial multiplexing of the streams and, thus, largely improve the channel capacity.

The above example shows how to manipulate the encoding and decoding vectors to nullify the interference in a single user-pair case. More often than not, ZFBF is adopted as an interference mitigation technique in multi-user MIMO scenarios, like cellular uplinks and downlinks. Such a situation is illiustrated belwo with two examples.

Figure 3:
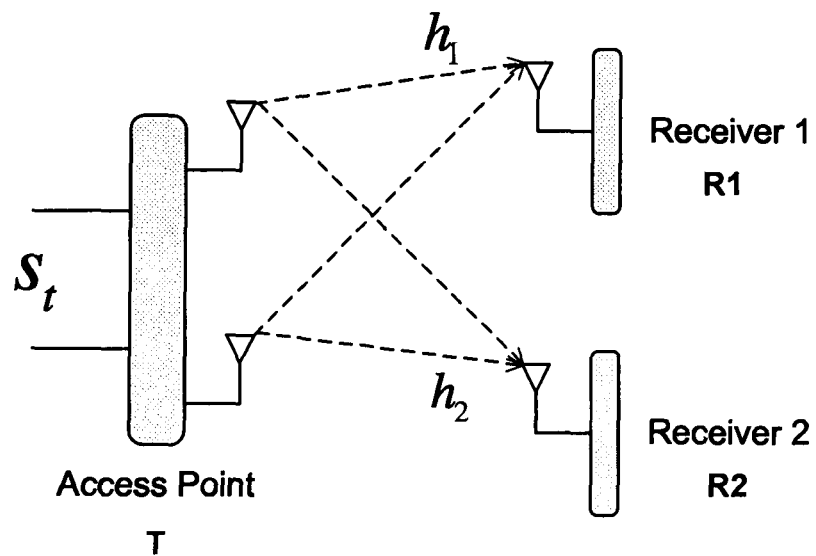
FIG. 3 shows a multi-user transmission case of two independent streams from a primary transmitter to two receivers, each receiver with one antenna and a transmitter, T with two antennas.

FIG. 3 shows a multi-user downlink transmission case of two independent streams from a primary transmitter, T, to two receivers, each receiver with one antenna and transmitter, T, with two antennas. T can send two streams $s_1$ and $s_2$ simultaneously to R1 and R2 respectively. The procedure is similar to that as described above in the 2×2 MIMO channel scenario. T applies the encoding vector $u_1$ and $u_2$ to encode the two streams and transmits the summed signal, which is represented as $s_t = u_1 s_1 + u_2 s_2$. Let the channel coefficient matrix from T to $R_i$ be $h_i$, which is now a 1×2 vector. Therefore, the received signal at $R_i$ is $\tilde{s}_i = h_i u_1 s_1 + h_i u_2 s_2 + n_i$. $u_1$ and $u_2$ can be chosen to satisfy $h_1 u_2 = h_2 u_1 = 0$, so that the received signals can be decoded as $$\tilde{s}_1 = h_1 u_1 s_1 + n_1\ \tilde{s}_2 = h_2 u_2 s_2 + n_2 \qquad (3)$$

Hence, two independent streams can be transmitted wihtout interference to two users in different locations respectively. Note that similar operations can be taken in the case of the reverse link. A general case when both transmitter and the receivers are equipped with multiple antennas is discussed in the prior art.

Figure 4:
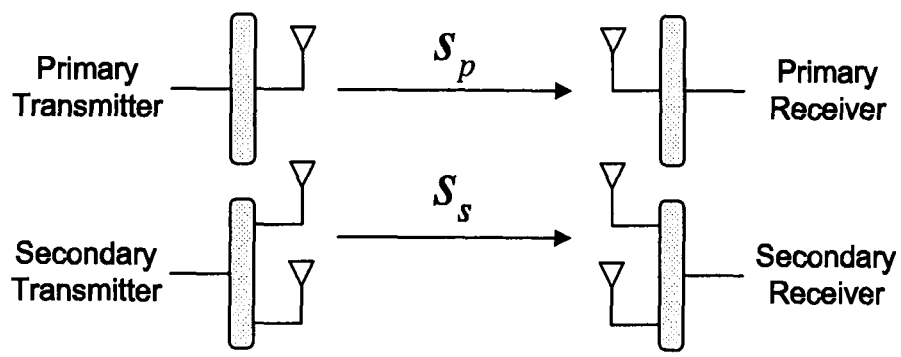
FIG. 4 shows transmission of two independent streams to two receivers.

FIG. 4 shows another example in which ZFBF improves the spatial reuse of the channel. Consider that a pair of PUs each include a primary link, each equipped with one antenna, and a pair of SUs forms a secondary link, each SU equipped with two antennas. The primary link and secondary link are within each other's interference range. The channel coefficient matrices between different transmitter-receiver combinations are denoted as $h_{PT,PR}$, $h_{PT,SR}$, $h_{ST,PR}$ and $H_{ST,SR}$. Note that depending on the number of transmitting and receiving antennas, their dimensions are 1×1, 2×1, 1×2 and 2×2 respectively.

Two independent streams, e.g. one primary stream $s_p$ and one secondary stream $s_s$, can be transmitted simultaneously. Suppose the encoding and decoding vectors applied to the secondary links are $u_s$ and $v_s$, the received signals on both primary and secondary receivers are $$\tilde{s}_p = h_{PT,PR}s_p + h_{ST,PR}u_s s_s + n_p$$

$$\tilde{s}_s = v_s^\dagger h_{PT,SR}s_p + v_s^\dagger H_{ST,SR}u_s s_s + v_s^\dagger n_s \qquad (4)$$

If $u_s$ and $v_s$ are configured so that $h_{ST,PR}u_s = 0$ and $v_s^\dagger h_{PT,SR} = 0$, the primary and secondary signals can be decoded without interference at the PU receiver and SU receiver, respectively. In this example, spatial reuse factor is increased by letting two interfering links transmit simultaneously. Interfernce is effectively cancelled by appropriately selecting the encoding and decoding vectors. With MIMO cognitive radio, the PUs' transmissions may not be affected when the SUs access the channel. However, it can be argued that such access rights should not be free but should still be granted by a mechanism such as cooperative relay, which will be discussed further below.

Although ZFBF can provide appealing benefits, several issues need to be carefully considered when employing ZFBF, which are discussed now below:

1) To properly configure the encoding and decoding vectors, both transmitters and receivers should be aware of the instantaneous channel coefficient matrices. This is a common assumption in various existing studies. However, even without such an assumption, practical physical layer estimation techniques exist, which give fairly good results, and have been already applied in implementations.

2) The ability of ZFBF is not unlimited. Fundamentally, the number of concurrent transmissions that can be scheduled are constrained by the DoF of the participating nodes, which is represented by the number of antennas. Below, careful consideration is given to the design of MIMO CCRN framework of the present invention to ensure that the design is MIMO-aware.

A system model of the MIMO CCRN framework of the present invention is described below. The new MIMO-based cooperative paradigm is presented in more detail as well. Also provided is a theoretical formulation for the primary transmission rate optimization problem as well as the achievable transmission rate for secondary links. Consideration is principally given to the case where the SUs are equipped with two antennas since it conveys the concept of the present invention and is simple in presentation. Also mounting two antennas on a portable device is very amenable to practical implementation. The MIMO CCRN framework of the present invention can be easily extended to more than two antennas.

Figure 5:
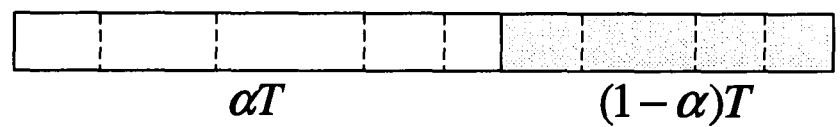
FIG. 5 shows an exemplary frame structure in the MIMO-aware cooperative cognitive radio network of the present invention.

Referring again to FIG. 1, consider that the secondary network includes |S| transmitter-receiver pairs S=(ST$_i$, SR$_i$), 1≤i≤|S|, where each node is equipped with two MIMO antennas. The primary transmission is divided into frames and T is used to represent the frame duration (FD). The PU link can select a subset of pairs S'⊆S, and for each selected pair, either ST or SR will participate as a relay in cooperative transmissions from the PU. Note that this sleection gives more flexibility to PUs' relay selection compared to the prior art, in which only STs in each pair can be chosen as the cooperative relays. R denotes the set of relay nodes. FIG. 5 shows an exemplary frame structure used in the present invention. If cooperative communication is adopted, a frame is divided into two time slots (phases). In the first time slot (phase one) with duration αT, the Primary Transmitter (PT) broadcasts the data to the chosen secondary relays (relay nodes). Then, in the second time slot (phase two) with duration (1−α)T, those secondary relays cooperatively transmit the data of the primary transmitter to the Primary Receiver (PR). α=1 represents a special case where the PT uses the entire frame for direct transmission to the PR without cooperation.

In return for the SUs' cooperation, channel access will be granted to them for their own transmissions. Since all the SUs are equipped with two MIMO antennas, the secondary data transmissions can be intelligently scheduled into the above described time slots 1 and 2. The detailed procedures are described next. It can be seen that compared to the existing CCRN schemes, the MIMO CCRN framework of the present invention totally avoids the use of a third time slot that has to be made available for dedicated secondary data transmissions in the prior art systems and thus, improves the primary link's throughput.

Figure 6:
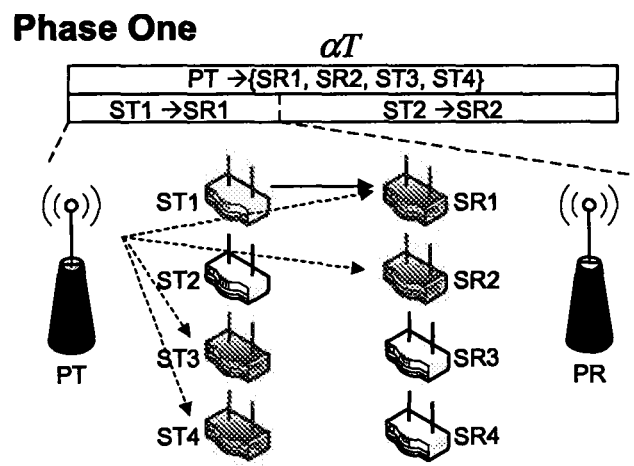
FIG. 6 shows phase one (time slot 1) cooperation in accordance with the principles of the present invention.

An exemplary system model for primary and secondary transmissions in phase one (time slot 1) is shown in FIG. 6. In this example, there are |S|=4 pairs of SUs. Suppose the PUs choose the relay set as R={SR$_1$, SR$_2$, ST$_3$, ST$_4$}, which implies S'=S. The detailed relay selection algorithm is described below.

Throughout phase one, PT continuously broadcasts its data to the chosen relays (relay nodes). For the secondary transmissions, the pairs with SR selected as relay nodes are allowed to access the channel in this phase. S$_1$ is used to denote the set of such pairs. In FIG. 6, they are the pairs (ST$_1$, SR$_1$) and (ST$_2$, SR$_2$). In a symmetric way, the pairs with ST selected as relay nodes, denoted by S$_2$ access the channel in phase two. In FIG. 6, S$_2$ includes (ST$_3$, SR$_3$) and (ST$_4$, SR$_4$). It is obvious that S$_1$ and S$_2$ are disjoint sets and |S$_1$|+|S$_2$|=|S'|. The pairs in S$_1$ share the channel in phase one in a TDMA fashion. Thus, phase one is further divided into |S$_1$| subslots (two in this example), one for each pair. The duration of each subslot is decided by a secondary power control game which will be described below.

h$_{0r}$ is used to represent the channel coefficient vector from PT to the relay node r, ∀r∈R Also H$_{ir}$ is used to represent the channel coefficient matrix from ST$_i$ to the relay node r, ∀i∈S$_1$, r∈R. Suppose a subslot of length T$_k^{(1)}$ is allocated to the comunication pair (ST$_k$, SR$_k$), k∈S$_1$. By virtue of multiple antennas, SR$_k$ can receive both streams from PT and ST$_k$ simultaneously in this subslot. Denote the primary stream as s$_p$ and the stream transmitted from ST$_k$ in this subslot as s$_k$. If ST$_k$ applies an encoding vector u$_k^{(s)}$ to s$_k$, then the received signal on relay node r in this subslot is the combination of PT's stream and ST$_k$'s stream as $$s_{r,k}^{(rec)} = h_{0r}s_p + H_{kr}u_k^{(s)}s_k + n \ \forall r \in R \quad (5)$$

which can be viewed as the combination of two vectors in a two-dimensional space. Then each relay node r can apply a decoding vector v$_{r,k}^{(p)}$ to decode the primary stream, by letting v$_{r,k}^{(p)\dagger}$H$_{kr}$u$_k^{(s)}$=0. The resulting primary signal on relay node r is then $$\tilde{s}_{r,k}^{(p)} = v_{r,k}^{(p)\dagger}h_{0r}s_p + v_{r,k}^{(p)\dagger}n \ \forall r \in R \quad (6)$$

Note that SR$_k$ is also included in the above equation if a certain relay node r* is SR$_k$ itself. To decode the secondary stream for itself, SR$_k$ uses another decoding vector v$_k^{(s)}$, and lets v$_k^{(s)\dagger}$h$_{0r*}$=0. Then the stream sent by ST$_k$ destined for SR$_k$ can be decoded as $$\tilde{s}_k = v_k^{(s)\dagger}H_{kr*}u_k^{(s)}s_k + v_k^{(s)\dagger}n \ r* = SR_k \quad (7)$$

Therefore in phase one, it can be clearly seen that the PT continuously transmits the primary data, while the relay pairs in set S$_1$ perform their own transmissions in their respective subslots.

In phase two, the idea can be similarly applied as in phase one. The selected relay nodes cooperatively transmit the primary data to the PR, meanwhile, the communication pairs with STs selected as relay nodes (forming set S$_2$) are allowed to access the channel in this phase, also in a TDMA fashion. For instance, (ST$_3$, SR$_3$) and (ST$_4$, SR$_4$) in FIG. 7 share the channel by dividing it into two subslots, one for each communication pair. The length of each subslot is determined by a secondary power control game as described below. H$_{ri}$ is used to denote the channel coefficient matrix from relay node r to SR$_i$, ∀r∈R,i∈S$_2$. Also h$_{r0}$ is used to represent the channel coefficient vector from relay node r to PR. Without ambiguity, s$_p$ and s$_k$ can still be used to denote the primary stream and the secondary stream that relay node ST$_k$ sends. Suppose a subslot is allocated to the communication pair (ST$_k$, SR$_k$), k∈S$_2$, since ST$_k$ has multiple antennas, it can transmit both primary and secondary streams to the PR and SR$_k$ respectively in the same spectrum without interference. ST$_k$ will transmit the summed signal of s$_p$ and s$_k$, each encoded with vectors u$_k^{(p)}$ and u$_k^{(s)}$ respectively, other relay nodes r only transmit s$_p$ encoded by u$_r^{(p)}$. If u$_k^{(s)}$ is chosen so that h$_{r*0}$u$_k^{(s)}$=0, where r*=ST$_k$, the secondary stream from ST$_k$ is totally nullified at PR. The signal received by PR is then $$\tilde{s}_p = \sum_{r \in R} h_{r0}u_r^{(p)}s_p + n \quad (8)$$

Moreover, specifically for SR$_k$, the received signal in this time slot is $$s_k^{(rec)} = \sum_{r \in R} H_{rk}u_r^{(p)}s_p + H_{r*k}u_k^{(s)}s_k + n \quad (9)$$

The first part of Equation (9) is the primary signal summed over all the relay nodes, and the second part is the secondary signal transmitted by ST$_k$. The received signal s$_k^{(rec)}$ can be also represented as two vectors existing in a two-dimensional space. The secondary signal s$_k$ can thus be easily decoded by choosing a decoding vector v$_k^{(s)}$ such that v$_k^{(s)\dagger}\Sigma_{r\in R}H_{rk}$u$_r^{(p)}$=0. The resulting secondary stream is $$\tilde{s}_k = v_k^{(s)\dagger}H_{r*k}u_k^{(s)}s_k + v_k^{(s)\dagger}n \quad (10)$$

In summary, in phase two the PR receives the primary signals sent from all the relay nodes, while the relay communication pairs in S$_2$ concurrently perform their own transmissions in their respective subslots.

Based on the system model of the present invention described above, the channel data rates for both primary and secondary link in each phase can be obtained.

For the cooperative communication, the use of a collaborative scheme based on decode-and-forward (DF) is assumed, and at the receiving end, PR exploits maximum ratio combining (MRC) before decoding the signal. Focus is on decode-and-forward strategy due to its simplicity, however the present invention can be extended to use more sophisticated coding and decoding techniques to obtain greater achievable rates for the primary links.

In phase one, since there are multiple relay nodes, the rate is easily shown to be dominated by the worst channel in the subset r∈ R. Suppose the transmission power of PT is $P_p$, according to Equation (6), in the subslot when $ST_k$ is transmitting the downlink rate is then $$R_k^{(PS)} = \log_2\left(1 + \frac{\min_{r \in R} |v_{r,k}^{(p)\dagger} h_{0r}|^2 P_P}{N_0}\right) \quad (11)$$

In phase two, since MRC is used, the effective SNR at PR is equal to the sum of all the SNRs of each secondary relay node. To maximize the throughput, the encoding vectors $u_r^{(p)}$ of all the relay nodes r,r∈ R in phase two can be chosen to be in the same direction as the channel matrix $h_{r0}$, i.e., $u_r^{(p)} = h_{r0}^*/\|h_{r0}\|$. Further using $P_r$, r∈ R to denote the transmission power of relay node r, based on Equation (8), the achievable rate of the cooperative link is given by $$R^{(SP)} = \log_2\left(1 + \sum_{r \in R} \frac{|h_{r0} u_r^{(p)}|^2 P_r}{N_0}\right) = \log_2\left(1 + \sum_{r \in R} \frac{\|h_{r0}\|^2 P_r}{N_0}\right) \quad (12)$$

Note that $R^{(SP)}$ is constant in all the subslots in phase two. The transmission powers $P_r$'s are determined by the secondary power control game described below.

Moreover, in the trivial case when secondary cooperation is not applied, the rate of the direct transmission from PT to PR is $$R_{dir} = \log_2\left(1 + \frac{|h_P|^2 P_P}{N_0}\right) \quad (13)$$

where $h_P$ is the channel gain from PT to PR.

For simplicity, it is assumed that a secondary transmitter will use a fixed power level for transmitting the secondary data to achieve a certain secondary data rate. Denote $P_k^{(s)}$ to be the power used by $ST_k$ for its secondary data transmission. In phase one, based on Equation (7), the transmission rate of secondary link ($ST_k$, $SR_k$) is given by $$R_k^{(s)} = \log_2\left(1 + \frac{|v_k^{(s)\dagger} H_{kr^*} u_k^{(s)}|^2 P_k^{(s)}}{N_0}\right) \quad \forall k \in S_1 \quad (14)$$

Specifically for each $ST_k$, $u_k^{(s)}$ can be chosen to maximize $\|H_{kr^*} u_k^{(s)}\|^2$, and then $v_k$ can be chosen chosen to satisfy $v_k^{(s)\dagger} h_{0r^*} = 0$. Accordingly, $v_{r,k}^{(p)\dagger}$ can be resolved for each relay node r given $u_k^{(s)}$.

In phase two, similarly from Equation (10), the transmission rate of secondary link ($ST_k$, $SR_k$) is given by $$\log_2\left(1 + \frac{|v_k^{(s)\dagger} H_{r^*k} u_k^{(s)}|^2 P_k^{(s)}}{N_0}\right) = R_k^{(s)} \quad \forall k \in S_2 \quad (15)$$

Since $u_r^{(p)}$ is given as $h_{r0}^*/\|h_{r0}\|$, $v_k^{(s)}$ is computed to satisfy $v_k^{(s)\dagger} \Sigma_{r \in R} H_{rk} u_r^{(p)} = 0$, and $u_k^{(s)}$ is chosen to be in the same direction as $v_k^{(s)\dagger} H_{r^*k}$.

Briefly summarizing the above, given a subset of relay communication pairs S' and the channel matrices, all the encoding and decoding vectors can be determined, thus the primary link rates $R_k^{(PS)}$ and $R^{(SP)}$ are resolved. Further, all the relay communication pairs can locally calculate the power they use to transmit their own signals.

The objective for the primary link is to optimize its throughput over different combinations of relay sets $S_1$, $S_2$, and the time length scale a of the two phases. The primary rate for cooperative communication is the minimum of the rate in the two phases:

$$R_{coop} = \min\left\{\sum_{k \in S_1} T_k^{(1)} R_k^{(PS)}, (1-\alpha)T \cdot R^{(SP)}\right\} \quad (16)$$

So the primary rate $R_P$ in this frame duration is $$R_P = \begin{cases} R_{dir} & \alpha = 0 \\ R_{coop} & \alpha > 0 \end{cases} \quad (17)$$

Thus, the primary link aims to solve the following primary rate optimization problem:

$$\max_{\alpha, S_1, S_2, T_k^{(1)}, P_r} R_P$$

$$\text{s.t.} \sum_{k \in S_1} T_k^{(1)} = \alpha T \quad (18)$$

$$0 \leq P_r \leq \overline{P}_r, \forall r \in R \quad (19)$$

$$S_1, S_2 \subseteq S \text{ and } S_1 \cap S_2 = \emptyset \quad (20)$$

$$0 \leq \alpha \leq 1 \quad (21)$$

Constraint (19) means the transmission power for the primary signal of each relay node r is bounded by $\overline{P}_r$, which is known in advance. Note the set R can be determined once the sets $S_1$ and $S_2$ are known.

In the context of spectrum leasing in CCRN, it is best to analyze the problem under a typical two-stage Stackelberg game framework. The primary link is the leader and the secondary communication pairs are the followers. They are all rational and selfish aiming to maximize their own utility. Since a PU is licensed to use the spectrum band, it possesses a higher priority in choosing the optimal relay sets (sets of relay nodes) and parameters. Secondary pairs in S compete with each other to determine the best strategy to share any unused portion of the licensed spectrum.

Guided by the above idea, in the present invention, the primary link aims to solve the primary rate optimization problem formulated above. It is necessary to decompose the problem. A secondary power control game can be used to obtain the relationship of optimal $T_k^{(1)}$ and $P_r$ with $S_1$, $S_2$ and $\alpha$. Then the primary links can determine the best relay sets $S_1$, $S_2$ and the parameter $\alpha$.

Define the utility function for the secondary communication pairs and analyze the existence of the equilibrium of the game. Given the two relay sets $S_1$, $S_2$ and the length of two phases (controlled by $\alpha$), a unique solution of $T_k^{(1)}$ and $P_r$ for each pair can be obtained to achieve the equilibrium, which is proved to be the best strategy for the secondary user.

For each secondary relay node k, the utility function is defined as the difference between the achievable transmission throughput and the cost of energy used for relaying the primary data signal, which then is $$\phi_k^{(s)} = \begin{cases} T_k^{(1)} R_k^{(s)} - wP_r(1-\alpha)T & \text{for } r = SR_k, k \in S_1 \\ T_k^{(2)} R_k^{(s)} - wP_r(1-\alpha)T & \text{for } r = ST_k, k \in S_2 \end{cases} \quad (22)$$

where $T_k^{(1)}$ and $T_k^{(2)}$ are subslot lengths allocated to the relay comunication pairs in $S_1$ and $S_2$ respectively, $R_k^{(s)}$ is determined by Equations (14) and (15), w is the cost per data unit of transmission energy.

Meanwhile, let $T_k^{(1)}$ and $T_k^{(2)}$ be proportional to relay node k's consumed energy for relaying the primary data, which is represented as $$T_k^{(1)} = \alpha T \cdot \frac{P_r}{\sum_{i \in S_1} P_i}, r = SR_k, k \in S_1 \quad (23)$$

$$T_k^{(2)} = (1-\alpha)T \cdot \frac{P_r}{\sum_{i \in S_2} P_i}, r = ST_k, k \in S_2$$

The utility function for each secondary relay pair is a function of their transmission power used for relaying the primary data signal, therefore a secondary power control game can be formulated. Secondary communication pairs in each set S, form a non-cooperative power selection game and compete with each other in the same set to maximize their own utility. The strategy space is the power $P=[P_r]$: $P_r^{min} \leq P_r \leq P_r^{max}$. The best strategy can be resolved for each relay in the Nash Equilibrium. Based on the above, the utility for the secondary communication pair k in $S_1$ is $$\Phi_k^{(s)} = \alpha T \cdot \frac{P_r}{\sum_{i \in S_1} P_i} R_k^{(s)} - wP_r(1-\alpha)T, r = SR_k, k \in S_1 \quad (24)$$

Next, the Nash Equilibrium is analyzed based on Equation (24). Similar methods can be applied to the game between the relay nodes in set $S_2$. The existence and uniqueness of the Nash Equilibrium will be shown first.

Theorem 1 A Nash Equilibrium Exists in the Secondary Power Control Game.

Proof: Note that Equation (24) has a form similar to the utility function defined in Equation (7). Using the same method, first prove that $P_r$ is a nonempty, convex and compact subset of the Euclidean space $\mathfrak{R}$, then prove that $\phi_k^{(s)}$ in Equation (24) is continuous and concave in $P_r$. A Nash Equilibrium then exists if these two conditions are satisfied. Details of the proof be found in several references known in the art.

To analyze the uniqueness of the equilibrium, reference is made to the best response function of player k given the power selection of other players. Since the utility function $\phi_k^{(s)}$ is concave, the best response is achieved when the first derivative of $\phi_k^{(s)}$ with $P_r$ equals to 0, as $$\frac{\partial u_k^{(s)}}{\partial P_r} = \frac{\alpha T R_k^{(s)} \sum_{i \in S_1, i \neq r} P_i}{\left(\sum_{i \in S_1} P_i\right)^2} - w(1-\alpha)T = 0 \quad (25)$$

Solving Equation (25) and avoiding the trivial cases when the power equals to $P_r^{min}$ or $P_r^{max}$, the best response is $$r_k(P) = \sqrt{\frac{\alpha T R_k^{(s)} \sum_{i \in S_1, i \neq r} P_i}{w(1-\alpha)T}} - \sum_{i \in S_1, i \neq r} P_i \quad (26)$$

with the following constraint satisfied:

$$P_r^{min} \leq r_k(P) \leq P_r^{max} \quad (27)$$

Theorem 2 The Secondary Power Control Game has a Unique Nash Equilibrium.

Proof: Again, it can be shown that the best response function $r_k(P)$ is a standard function which is positive, monotonic and scalable. Therefore, there exists a unique Nash Equilibrium point for the secondary power control game.

Solving Equation (25) including $|S_1|$ equations, the resulting relaying power for the relay node r is $$P_r^* = \frac{\alpha(|S_1|-1)}{w(1-\alpha)\sum_{i \in S_1} \frac{1}{R_i^{(s)}}} \left(1 - \frac{(|S_1|-1)}{R_k^{(s)} \sum_{i \in S_1} \frac{1}{R_i^{(s)}}}\right) \quad (28)$$

where $r=SR_k$ and $k \in S_1$.

Similarly, it can be shown that the Nash Equilibrium also exists and is unique for the secondary power control game among the secondary relay comunication pairs in the set $S_2$. The relaying power for each pair should be chosen as $$P_r^* = \frac{(|S_2|-1)}{w \sum_{i \in S_2} \frac{1}{R_i^{(s)}}} \left(1 - \frac{(|S_2|-1)}{R_k^{(s)} \sum_{i \in S_2} \frac{1}{R_i^{(s)}}}\right) \quad (29)$$

where $r=ST_k$ and $k \in S_2$. Note that $P_r^*$ is independent of $\alpha$ for relay communication pairs which belong to $S_2$.

Based on the analytical result of the secondary power control game, PU, as the leader of the Stackelberg game, can determine its strategy to solve the formulated primary user rate optimization problem. Here the PU's utility is the rate, or throughput that it can achieve in the current FD.

Given the relay sets $S_1$, $S_2$ and $\alpha$, the relaying power for each relay node can be resolved according to Equation (28) and (29). To resolve the optimal $\alpha$, the equations of the relaying power can be rewritten as $$P_r^* = \begin{cases} \frac{\alpha}{1-\alpha} \cdot A_r & \forall r \in S_1 \\ B_r & \forall r \in S_2 \end{cases} \quad (30)$$

where $$A_r = \frac{(|S_1|-1)}{w \sum_{i \in S_1} \frac{1}{R_i^{(s)}}} \left(1 - \frac{(|S_1|-1)}{R_k^{(s)} \sum_{i \in S_1} \frac{1}{R_i^{(s)}}}\right)$$

$$B_r = \frac{(|S_2|-1)}{w \sum_{i \in S_2} \frac{1}{R_i^{(s)}}} \left(1 - \frac{(|S_2|-1)}{R_k^{(s)} \sum_{i \in S_2} \frac{1}{R_i^{(s)}}}\right)$$

$A_r$ and $B_r$ are known if $S_1$, $S_2$ and the secondary link rates are given. Substituting Equation (30) into Equation (12), the resulting link rate in the second phase (second time slot) is $$R^{(SP)} = \log_2\left(1 + \sum_{r \in S_1} \frac{\|h_{r0}\|^2 \cdot \frac{\alpha}{1-\alpha} A_r}{N_0} + \sum_{r \in S_2} \frac{\|h_{r0}\|^2 \cdot B_r}{N_0}\right) = \quad (31)$$

$$\log_2\left(1 + A \cdot \frac{\alpha}{1-\alpha} + B\right)$$

where $$A = \sum_{r \in S_1} \frac{\|h_{r0}\|^2 \cdot A_r}{N_0} \text{ and } B = \sum_{r \in S_2} \frac{\|h_{r0}\|^2 \cdot B_r}{N_0}.$$

Moreover, it has been shown that in two-phase cooperative communications, the throughput is maximized when the downlink throughput equals the uplink throughput. In the present problem (maximizing the PU's throughput) is then $$\sum_{k \in S_1} \frac{T_k^{(1)} R_k^{(PS)}}{R^{(SP)}} = (1-\alpha)T \quad (32)$$

Figure 8:
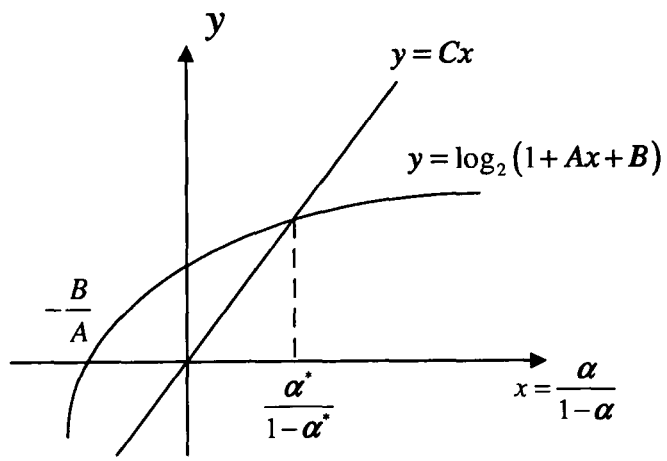

Expanding Equation (32) based on Equation (23), results in $$\sum_{k \in S_1} \alpha T \cdot \frac{P_k^*}{\sum_{i \in S_1} P_i^*} \cdot R_k^{(PS)} = R^{(SP)}(1-\alpha)T \quad (33)$$

$$\text{Let } C = \frac{\sum_{k \in S_1} P_k^* R_k^{(PS)}}{\sum_{i \in S_1} P_i^*} \quad (34)$$

and substituting Equation (31) into Equation (32), yields $$\log_2\left(1 + A \cdot \frac{\alpha^*}{1-\alpha^*} + B\right) = C \cdot \frac{\alpha^*}{1-\alpha^*}$$

where α* is the optimal α. So $$\frac{\alpha^*}{1-\alpha^*}$$

is the x-coordinate of the intersection point between a log function and a straight line passing through the origin, as shown in FIG. 8. Its value can be achieved by any known numerical methods which then gives the value of α*

To summarize the above, the optimal time durations of the two phases, which is determined by α, can be resolved by using known numerical methods on Equation (34) if $S_1$ and $S_2$ are given.

Based on the previous analysis, given $S_1$ and $S_2$, α* can be resolved, which determines the optimal time duration for each phase (time slot). From the universal set of the relay communication pairs S, the PU can enumerate all the possible sets $S_1$ and $S_2$ which satisfy the criteria of Equation (27). From all the possible sets, the one that maximizes PU's utility function $R_P$ can be selected. The brute-force method has unfortunately highly complex.

Figure 9:
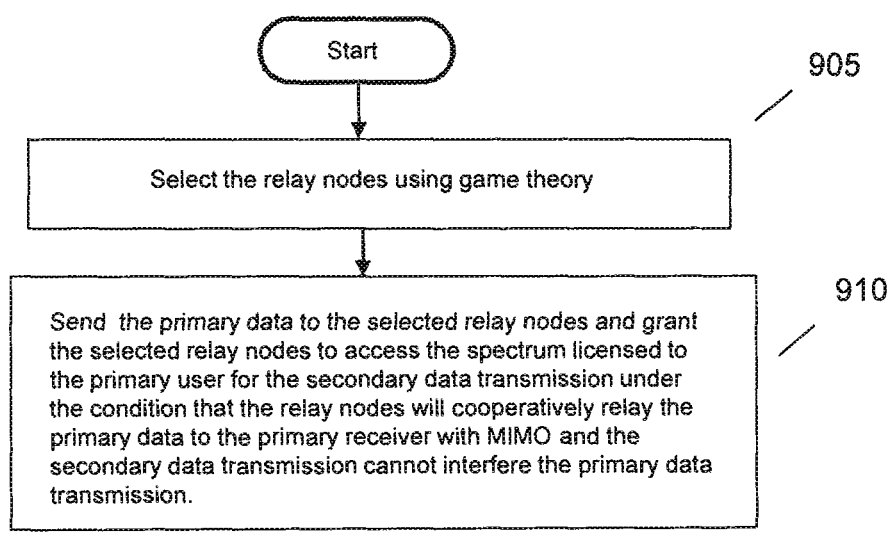
FIG. 9 is a flowchart for an exemplary primary transmitter process in MIMO cooperative cognitive radio networks in accordance with the principles of the present invention.

FIG. 9 is a flowchart for an exemplary primary transmitter process in MIMO cooperative cognitive radio networks in accordance with the principles of the present invention. At 905 the relay nodes are selected using Stackelberg game theory. At 910, the PU transmits the primary data to the selected relay nodes and grants the selected relay nodes access to unused portions of the spectrum licensed to the primary user for secondary data transmission under the condition that the selected relay nodes will cooperatively relay the primary data to the primary receiver with MIMO and any secondary data transmissions cannot interfere with the primary data transmission.

Figure 10:
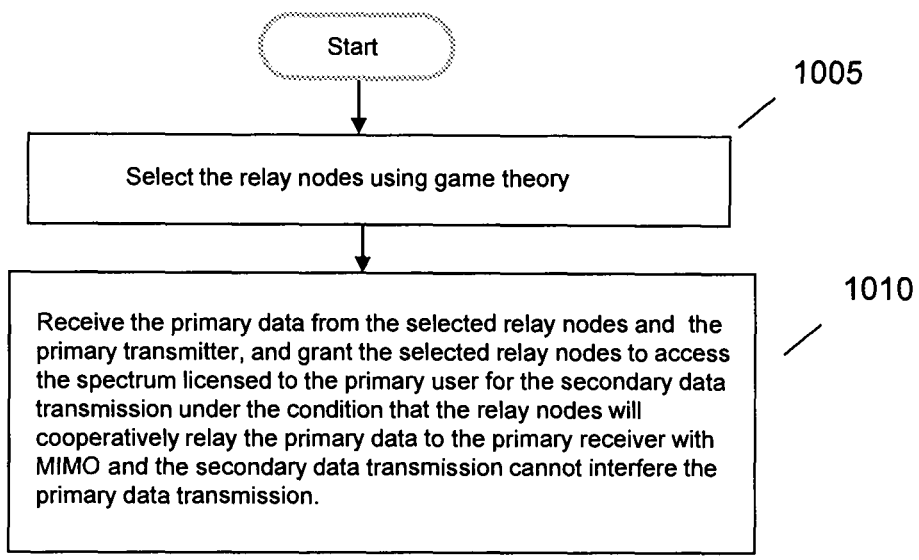
FIG. 10 is a flowchart for an exemplary primary receiver process in MIMO cooperative cognitive radio networks in accordance with the principles of the present invention.

FIG. 10 is a flowchart for an exemplary primary receiver process in MIMO cooperative cognitive radio networks in accordance with the principles of the present invention. At 1005 the relay nodes are selected using Stackelberg game theory. At 1010, the PU receives the primary data from the selected relay nodes and the primary transmitter, and grants the selected relay nodes access to unused portions of the spectrum licensed to the primary user for secondary data transmission under the condition that the relay nodes will cooperatively relay the primary data to the primary receiver with MIMO and any secondary data transmissions cannot interfere the primary data transmission.

Figure 7:
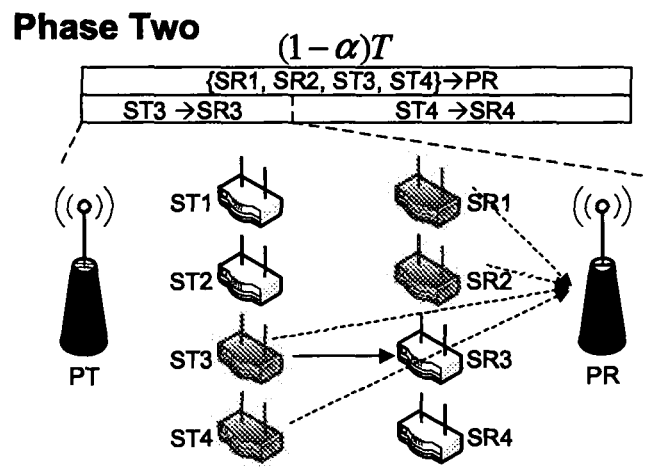
FIG. 7 shows phase two (time slot 2) cooperation in accordance with the principles of the present invention.
Figure 11:
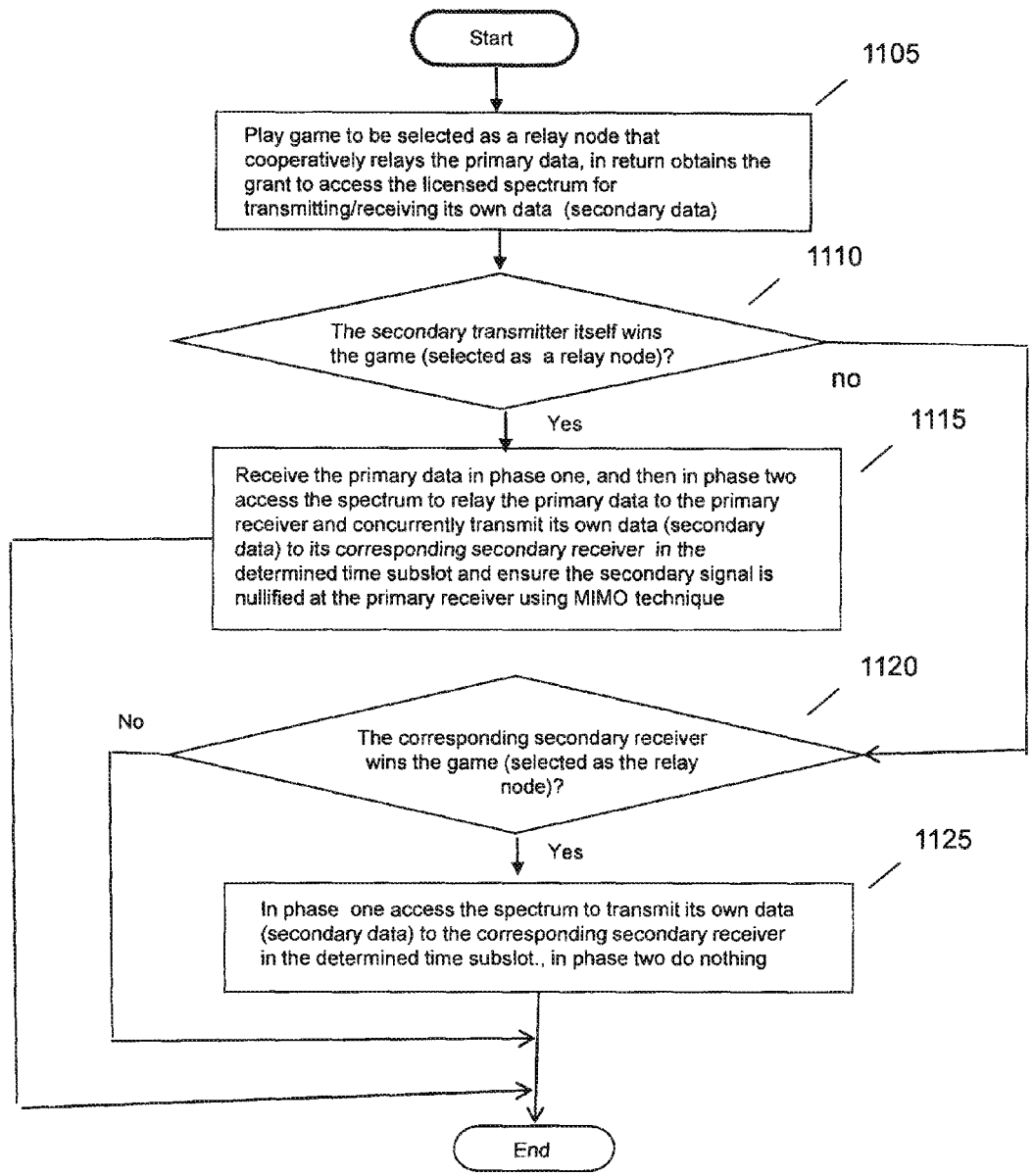
FIG. 11 is a flowchart for an exemplary secondary transmitter process in MIMO cooperative cognitive radio networks in accordance with the principles of the present invention.

FIG. 11 is a flowchart for an exemplary secondary transmitter process in MIMO cooperative cognitive radio networks in accordance with the principles of the present invention. At 1105 the secondary transmitter plays the Stackelberg game (power game) to be selected as a relay node that cooperatively relays primary data and in return obtains permission to access unused portions of the spectrum licensed to the PU for transmission and reception of its own data (secondary data). The Stackelberg game is the method to play the secondary power game. It means that the primary users know the information of the secondary users (channel, power, etc.) and the game results that the secondary users will obtain. At 1110 a test is performed to determine if the secondary transmitter has been selected as a relay node. If the secondary transmitter has been selected as a relay node then at 1115 the secondary transmitter receives the primary data in phase one (time slot 1) and then in phase two (time slot 2) accesses unused portions of the spectrum licensed to the PU to relay the primary data to the primary receiver and concurrently transmit its own data (secondary data) to its corresponding secondary receiver in the determined time subslot and ensure the secondary data signal is nullified at the primary receiver using MIMO techniques. "Nullified" in this sense means that the secondary data signal cannot interfere with the primary data signal at the primary receiver. It is not possible in the game for both the secondary transmitter and its corresponding secondary receiver to both be selected as relay nodes at the same time so processing ends since from the above the secondary transmitter was selected as a relay node. If the secondary transmitter was not selected as a relay node then processing proceeds to 1120, where a test is performed to determine if the corresponding secondary receiver (of the secondary transmitter not selected as a relay node) has been selected as a relay node in the Stackelberg game. If the corresponding secondary receiver (of the secondary transmitter not selected as a relay node) has been selected as a relay node in the Stackelberg game then at 1125 the secondary transmitter (not selected as a relay node) accesses unused portions of the spectrum licensed to the PU in phase one (time slot 1) to transmit its own data (secondary data) to its corresponding secondary receiver in the determined time subslot. In phase two (time slot 2) the secondary transmitter (not selected as a relay node) does nothing with respect to its own data (secondary data) or the primary data. If the corresponding secondary receiver has not been selected as a relay node in the Stackelberg game, then processing ends. An example would be helpful at this point. Remembering that FIG. 11 is directed to a secondary transmitter and using FIG. 6 and FIG. 7, the secondary transmitter plays the Stackelberg game to see if the primary transmitter selects it to act as a relay node. If the secondary transmitter is selected as a relay node then it relays the primary data and in return obtains access to the licensed spectrum held by the primary transmitter in order to transmit its own (secondary) data to a corresponding secondary receiver. In a first scenario consider that the secondary transmitter is ST3 and it has played the Stackelberg game and is a relay node for a primary transmitter as shown in FIG. 6 and FIG. 7. At 1110 ST3 would determine that it won the game and is a relay node so the process in 1115 is executed. ST3's corresponding receiver is SR3. The test at 1120 would be negative since SR3 was not selected as a relay node so processing would end. In a second scenario, consider that the secondary receiver is ST1 and it played the Stackelberg game and was not selected as a relay node for a primary transmitter as shown in FIG. 6 and FIG. 7. ST1's corresponding secondary receiver is SR1. At 1110 ST1 would determine that it had not won the game and was not a relay node so processing would proceed to 1120. At 1120, ST1 would perform a test to determine if its corresponding receiver had won the Stackelberg game and was a relay node. According to FIG. 6 and FIG. 7 SR1 is a relay node, so the processing in 1125 is performed. In the case not shown in FIG. 6 and FIG. 7 where a secondary pair of transmitters and receivers existed but neither had been selected as relay nodes then they would not be entitled to use of any of the unused portions of the licensed spectrum owned by the primary transmitter. In this case the results of the tests at 1110 and 1120 would both be negative so processing would end.

Figure 12:
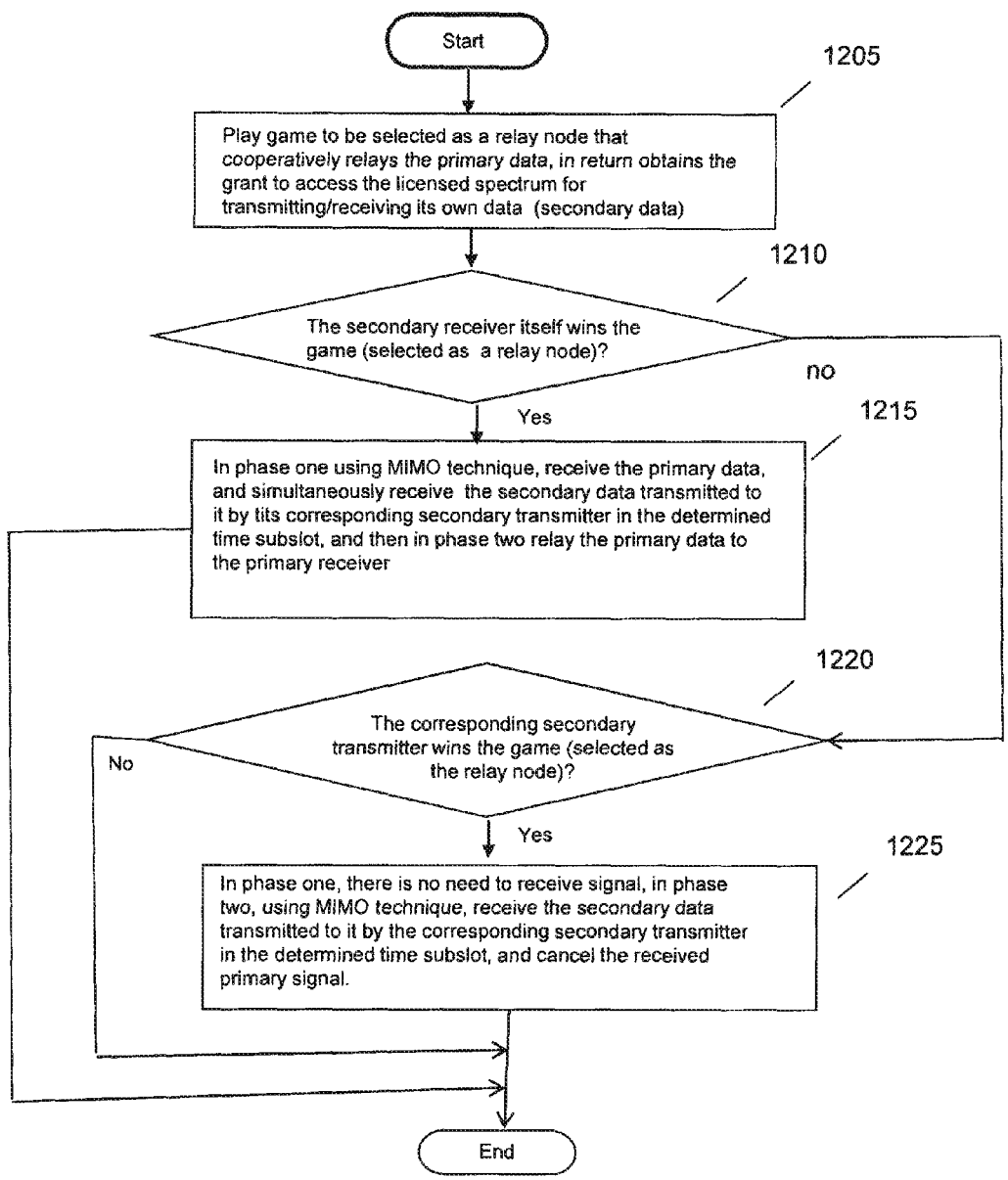
FIG. 12 is a flowchart for an exemplary secondary receiver process in MIMO cooperative cognitive radio networks in accordance with the principles of the present invention.

FIG. 12 is a flowchart for an exemplary secondary receiver process in MIMO cooperative cognitive radio networks in accordance with the principles of the present invention. At 1205 the secondary receiver plays the Stackelberg game (power game) to be selected as a relay node that cooperatively relays primary data and in return obtains permission to access unused portions of the spectrum licensed to the PU for transmission and reception of its own data (secondary data). The Stackelberg game is the method to play the secondary power game. It means that the primary users know the information of the secondary users (channel, power, etc.) and the game results that the secondary users will obtain. At 1210 a test is performed to determine if the secondary receiver was selected as a relay node in the Stackelberg game. If the secondary receiver was selected as a relay node in the Stackelberg game then at 1215 in phase one (time slot 1) using MIMO techniques, receive the primary data, and simultaneously receive the secondary data transmitted to it by the corresponding secondary transmitter in the determined time subslot, and then in phase two (time slot 2) relay the primary data to the primary receiver. It is not possible in the game for both the secondary transmitter and its corresponding secondary receiver to both be selected as relay nodes at the same time so processing ends since from the above the secondary receiver was selected as a relay node. If the secondary receiver was not selected as a relay node then processing proceeds to 1220, where a test is performed to determine if the corresponding secondary transmitter (of the secondary receiver which was not selected as a relay node) was selected as a relay node in the Stackelberg game. If the corresponding secondary transmitter (of the secondary receiver which was not selected as a relay node) was selected as a relay node in the Stackelberg game then at 1225 in phase one, there is no need to receive a secondary data signal and in phase two, using MIMO techniques, receive the secondary data transmitted to it by its corresponding secondary transmitter in the determined time subslot, and cancel (nullify) the received primary signal. "Nullify" in this sense means that the secondary data signal cannot interfere with the primary data signal at the primary receiver. If the corresponding secondary transmitter (of the secondary receiver which was not selected as a relay node) was not selected as a relay node in the Stackelberg game then processing ends. An example would be helpful at this point. Remembering that FIG. 12 is directed to a secondary receiver and using FIG. 6 and FIG. 7, the secondary receiver plays the Stackelberg game to see if the primary transmitter selects it to act as a relay node. If the secondary receiver is selected as a relay node then it relays the primary data and in return obtains access to the licensed spectrum held by the primary transmitter in order to receive its own (secondary) data from a corresponding secondary transmitter. In a first scenario consider that the secondary receiver is SR1 and it has played the Stackelberg game and is a relay node for a primary transmitter as shown in FIG. 6 and FIG. 7. At 1210 SR1 would determine that it won the game and is a relay node so the process in 1215 is executed. SR1's corresponding transmitter is ST1. The test at 1220 would be negative since ST1 was not selected as a relay node so processing would end. In a second scenario, consider that the secondary receiver is SR3 and it played the Stackelberg game and was not selected as a relay node for a primary transmitter as shown in FIG. 6 and FIG. 7. SR3's corresponding secondary transmitter is ST3. At 1210 SR3 would determine that it had not won the game and was not a relay node so processing would proceed to 1220. At 1220, SR3 would perform a test to determine if its corresponding transmitter had won the Stackelberg game and was a relay node. According to FIG. 6 and FIG. 7 ST3 is a relay node, so the processing in 1225 is performed. In the case not shown in FIG. 6 and FIG. 7 where a secondary pair of transmitters and receivers existed but neither had been selected as relay nodes then they would not be entitled to use of any of the unused portions of the licensed spectrum owned by the primary transmitter. In this case the results of the tests at 1210 and 1220 would both be negative so processing would end.

Figure 13:
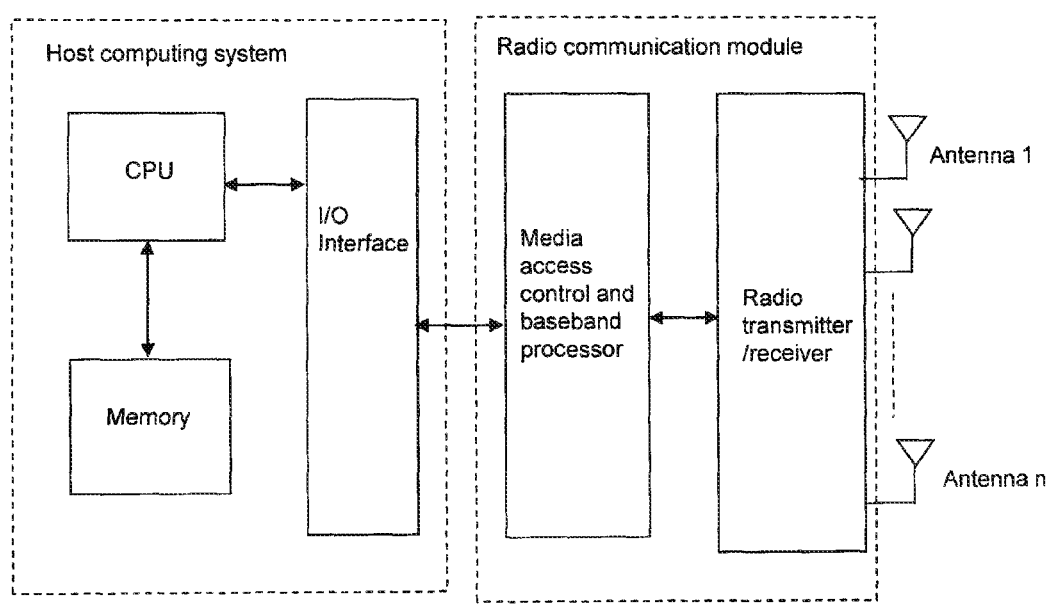
FIG. 13 is a block diagram of an exemplary MIMO cognitive radio device implementation in accordance with the principles of the present invention.

Referring now to FIG. 13, which is a block diagram of an exemplary cognitive radio device implementation of the present invention. Since a cognitive radio device (station, node, gateway, AP, base station) can be a transmitter, a receiver or a transceiver, a single block diagram is used showing a wireless communication module 1325 having a radio transmitter/receiver 1335. That is, the radio transmitter/receiver can be a transmitter, a receiver or a transceiver. The present invention includes a host computing system 1305 and a communication module (wireless) 1325. The host processing system can be a general-purpose computer or a specific-purpose computing system. The host computing system can include a central processing unit (CPU) 1310, a memory 1315 and an input/output (I/O) interface 1320. The wireless communication module 1325 can include a media access control (MAC) and baseband processor 1330, radio transmitter/receiver 1335, and one or more antennas. An antenna transmits and receives the radio signals. The radio transmitter/receiver 1335 performs radio signal processing. The MAC and baseband processor 1330 performs MAC control and data framing, modulation/demodulation, coding/decoding for the transmission/receiving. At least one embodiment of the present invention can be implemented as a routine in the host computing system or wireless communication module to process the transmission and receiving of data and control signal. That is, the block diagram of FIG. 13 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagram thus fully enables the various methods/processes to be practiced in hardware, software, firmware, a field programmable gate array (FPGA), an application specific integrated circuit (ASIC), a reduced instruction set computer (RISC) or any combination thereof.

When the cognitive radio device is behaving as a secondary transmitter the control logic includes means for competing by a secondary transmitter with a plurality of secondary nodes in a cognitive radio network to become a relay node for a primary transmitter, the secondary nodes being secondary transmitters and secondary receivers. The secondary transmitter ensures that a signal carrying its own the secondary data is nullified at the primary receiver by using multiple-in-multiple-out transmission means. The competition is conducted using game theory, based on a Stackelberg game. The transceiver includes means for receiving data transmitted by the primary transmitter in a first time slot if the secondary transmitter was successful in the competition, means for relaying the received data transmitted by the primary transmitter to a primary receiver in a second time slot, means for transmitting secondary data to a corresponding secondary receiver in a subslot of the second time slot, and means for transmitting the secondary data the corresponding secondary receiver in a subslot of the first time slot if the secondary transmitter was not successful in the competition and if the corresponding secondary receiver was successful in the competition. The secondary transmitter ensures that a signal carrying its own the secondary data is nullified at the primary receiver by using multiple-in-multiple-out transmission means.

When the cognitive radio device is behaving as a secondary receiver the control logic includes means for competing by a secondary receiver with a plurality of secondary nodes in a cognitive radio network to become a relay node for a primary transmitter, the secondary nodes being secondary transmitters and secondary receivers, means for determining if the competing secondary receiver was successful and means for determining if its the corresponding secondary transmitter was successful in the competition and is the relay node responsive to the first determination. The competition is conducted using game theory, based on a Stackelberg game. The transceiver includes means for receiving data transmitted by the primary transmitter in a first time slot and receiving secondary data transmitted by a corresponding secondary transmitter in a subslot of the first time slot if the secondary receiver was successful in the competition, means for relaying the received data transmitted by the primary transmitter to a primary receiver in a second time slot and means for receiving the secondary data from the corresponding secondary transmitter in a subslot of the second time slot if the secondary receiver was not successful in the competition and if the corresponding secondary transmitter was successful in the competition. The secondary receiver uses multiple-in-multiple-out means.

When the cognitive radio device is behaving as a primary transmitter or receiver then the control logic includes means for selecting a relay node using game theory and the transceiver includes one of means for transmitting primary data to the relay node and means for receiving primary data from the relay node. The game theory is based on a Stackelberg game. The transmitting means is in a primary transmitter and the receiving means is in a primary receiver, wherein the means for transmitting is executed in a first time slot and the means for receiving is executed in a second time slot.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
competing by a secondary transmitter with a plurality of secondary nodes in a cognitive radio network to become a relay node for a primary transmitter, said secondary nodes being secondary transmitters and secondary receivers;
receiving data transmitted by said primary transmitter in a first time slot if said secondary transmitter was successful in said competition;

relaying said received data transmitted by said primary transmitter to a primary receiver in a second time slot;

transmitting secondary data to a corresponding secondary receiver in a subslot of said second time slot; and transmitting said secondary data to said corresponding secondary receiver in a subslot of said first time slot if said secondary transmitter was not successful in said competition and if said corresponding secondary receiver was successful in said competition.

2. The method according to claim 1, wherein said secondary transmitter ensures that a signal carrying said secondary data is nullified at said primary receiver by using multiple-in-multiple-out transmission techniques.

3. The method according to claim 1, wherein said competition is conducted using game theory.

4. The method according to claim 3, wherein said game theory is based on a Stackelberg game.

5. A method, said method comprising:

competing by a secondary receiver with a plurality of secondary nodes in a cognitive radio network to become a relay node for a primary transmitter, said secondary nodes being secondary transmitters and secondary receivers;

receiving data transmitted by said primary transmitter in a first time slot and receiving secondary data transmitted by a corresponding secondary transmitter in a subslot of said first time slot if said secondary receiver was successful in said competition;

relaying said received data transmitted by said primary transmitter to a primary receiver in a second time slot; and receiving said secondary data from said corresponding secondary transmitter in a subslot of said second time slot if said secondary receiver was not successful in the competition and if said corresponding secondary transmitter was successful in said competition.

6. The method according to claim 5, wherein said secondary receiver uses multiple-in-multiple-out techniques.

7. The method according to claim 5, wherein said competition is conducted using game theory.

8. The method according to claim 7, wherein said game theory is based on a Stackelberg game.

9. An apparatus, comprising:

control logic for competing by a secondary transmitter with a plurality of secondary nodes in a cognitive radio network to become a relay node for a primary transmitter, said secondary nodes being secondary transmitters and secondary receivers;

a transceiver for receiving data transmitted by said primary transmitter in a first time slot if said secondary transmitter was successful in said competition, for relaying said received data transmitted by said primary transmitter to a primary receiver in a second time slot, for transmitting secondary data to a corresponding secondary receiver in a subslot of said second time slot, and for transmitting said secondary data to said corresponding secondary receiver in a subslot of said first time slot if said secondary transmitter was not successful in said competition and if said corresponding secondary receiver was successful in said competition.

10. The apparatus according to claim 9, wherein said secondary transmitter ensures that a signal carrying said secondary data is nullified at said primary receiver by using multiple antennas.

11. The apparatus according to claim 9, wherein said competition is conducted using game theory.

12. The apparatus according to claim 11, wherein said game theory is based on a Stackelberg game.

13. An apparatus, comprising:

control logic for competing by a secondary receiver with a plurality of secondary nodes in a cognitive radio network to become a relay node for a primary transmitter, said secondary nodes being secondary transmitters and secondary receivers;

a transceiver for receiving data transmitted by said primary transmitter in a first time slot and receiving secondary data transmitted by a corresponding secondary transmitter in a subslot of said first time slot if said secondary receiver was successful in said competition, for relaying said received data transmitted by said primary transmitter to a primary receiver in a second time slot, and for receiving said secondary data from said corresponding secondary transmitter in a subslot of said second time slot if said secondary receiver was not successful in the competition and if said corresponding secondary transmitter was successful in said competition.

14. The apparatus according to claim 13, wherein said secondary receiver uses multiple antennas.

15. The apparatus according to claim 13, wherein said competition is conducted using game theory.

16. The apparatus according to claim 15, wherein said game theory is based on a Stackelberg game.

* * * * *